(12) United States Patent
Carolan

(10) Patent No.: US 7,311,755 B2
(45) Date of Patent: Dec. 25, 2007

(54) CONTROL OF DIFFERENTIAL STRAIN DURING HEATING AND COOLING OF MIXED CONDUCTING METAL OXIDE MEMBRANES

(75) Inventor: Michael Francis Carolan, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 403 days.

(21) Appl. No.: 10/943,574

(22) Filed: Sep. 17, 2004

(65) Prior Publication Data

US 2006/0060080 A1    Mar. 23, 2006

(51) Int. Cl.
*B01D 53/22* (2006.01)

(52) U.S. Cl. .............. 95/54; 95/14; 95/15; 95/19; 95/43; 96/4; 96/7; 96/11

(58) Field of Classification Search .............. 95/14, 95/15, 19, 43, 54; 96/4, 7, 11; 429/12, 13
See application file for complete search history.

(56) References Cited

U.S. PATENT DOCUMENTS

| | | | |
|---|---|---|---|
| 4,211,537 A | 7/1980 | Teitel | 48/191 |
| 5,409,046 A | 4/1995 | Swenson et al. | 141/11 |
| 5,681,373 A * | 10/1997 | Taylor et al. | 96/11 |
| 5,702,491 A | 12/1997 | Long et al. | 48/197 R |
| 5,725,965 A | 3/1998 | Wachsman et al. | 429/33 |
| 5,762,119 A | 6/1998 | Platz et al. | 141/231 |
| 5,778,972 A | 7/1998 | Sapru et al. | 165/104.12 |
| 5,788,748 A * | 8/1998 | Mazanec et al. | 96/4 |
| 5,837,125 A | 11/1998 | Prasad et al. | |
| 5,861,137 A | 1/1999 | Edlund | 423/652 |
| 5,911,860 A | 6/1999 | Chen et al. | 204/295 |
| 5,954,101 A | 9/1999 | Drube et al. | 141/82 |
| 5,964,965 A | 10/1999 | Schulz et al. | 148/420 |
| 5,976,223 A * | 11/1999 | Prasad et al. | 95/54 |
| 5,983,962 A | 11/1999 | Gerardot | 141/231 |
| 5,997,594 A | 12/1999 | Edllund et al. | 48/76 |
| 6,056,807 A * | 5/2000 | Carolan et al. | 96/4 |
| 6,090,500 A * | 7/2000 | Ishihara et al. | 96/4 |
| 6,193,929 B1 | 2/2001 | Ovshinsky | 420/402 |
| 6,221,117 B1 | 4/2001 | Edlund et al. | 48/76 |
| 6,305,442 B1 | 10/2001 | Ovshinsky et al. | 141/231 |
| 6,375,906 B1 | 4/2002 | Edlund et al. | 422/189 |
| 6,492,290 B1 * | 12/2002 | Dyer et al. | 96/11 |
| 6,503,296 B1 * | 1/2003 | Vigeland et al. | 95/54 |
| 6,745,801 B1 | 6/2004 | Cohen et al. | 141/231 |
| 7,122,072 B2 * | 10/2006 | Carolan et al. | 95/54 |
| 2002/0022568 A1 | 2/2002 | Mackay et al. | |
| 2002/0029820 A1 | 3/2002 | Ovshinsky et al. | 141/110 |
| 2002/0073618 A1 | 6/2002 | Ovshinsky et al. | 48/61 |
| 2002/0106495 A1 | 8/2002 | Sirman et al. | |
| 2003/0009942 A1 | 1/2003 | Amendola et al. | 48/61 |

FOREIGN PATENT DOCUMENTS

| | | |
|---|---|---|
| CN | 1127235 A | 7/1996 |
| EP | 0 705 790 A1 | 4/1996 |
| EP | 0957063 | 11/1999 |
| WO | 01/28017 | 4/2001 |
| WO | 01/92147 | 12/2001 |
| WO | WO 02/16015 A1 | 2/2002 |

OTHER PUBLICATIONS

S. B. Adler, "Chemical Expansivity of Electrochemical Ceramics", J. Am. Ceram. Soc. 84 (9) 2117-19 (2001).
P. V. Hendriksen, et al., "Prospects and Problems of Dense Oxygen Permeable Membranes", Catalysis Today 56, (2000) 283-295.
Martijn H. R. Lankhorst, et al., "Use of the Rigid Band Formalism to Interpret the Relationship Between O Chemical Potential and Electron Concentration in $La_{1-x}Sr_xCoO_{3-\delta}$", 1996 The American Physical Society, Physical Review Letters, vol. 77, No. 14, Sep. 30, 1996, pp. 2989-2992.
W. Rodger Cannon, et al., "Review Creep of Ceramics", Journal of Materials Science 18 (1983) 1-50.
Idatech Product Brochure, 2002.
Proton Energy Systems Product Brochure, Rev. Aug. 2001 and Jun. 2001.
Millennium Cell—Website for Hydrogen on Demand Fact Sheet, downloaded on Jan. 24, 2003.
Proton Energy Systems—Website for Hydrogen Generator download brochure, downloaded on Feb. 11, 2003.
European Search Report No. 05019991.8-2113 dated Feb. 16, 2006.

* cited by examiner

*Primary Examiner*—Jason M. Greene
(74) *Attorney, Agent, or Firm*—Keith D. Gourley

(57) ABSTRACT

Method of operating an oxygen-permeable mixed conducting membrane having an oxidant feed side and a permeate side, which method comprises controlling the differential strain between the oxidant feed side and the permeate side by varying either or both of the oxygen partial pressure and the total gas pressure on either or both of the oxidant feed side and the permeate side of the membrane while changing the temperature of the membrane from a first temperature to a second temperature.

36 Claims, 3 Drawing Sheets

CONTROL OF DIFFERENTIAL STRAIN DURING HEATING AND COOLING OF MIXED CONDUCTING METAL OXIDE MEMBRANES

STATEMENT REGARDING FEDERALLY SPONSORED RESEARCH OR DEVELOPMENT

This invention was made with government support under Contract No. DE-FC26-98FT40343 between Air Products and Chemicals, Inc. and the U.S. Department of Energy. The Government has certain rights to this invention.

BACKGROUND OF THE INVENTION

Ceramic materials containing certain mixed metal oxide compositions possess both oxygen ion conductivity and electronic conductivity at elevated temperatures. These materials, known in the art as mixed conducting metal oxides, may be used in applications including gas separation membranes and membrane oxidation reactors. These ceramic membranes are made of selected mixed metal oxide compositions and have been described as ion transport membranes (ITM). A characteristic property of these materials is that their oxygen stoichiometry is a thermodynamic function of temperature and oxygen partial pressure wherein the equilibrium oxygen stoichiometry decreases with increasing temperature and with decreasing oxygen partial pressure.

It is known that the dimensions of materials change with changing temperature due to thermal expansion and contraction. In addition to these thermal dimensional changes, mixed conducting metal oxide materials undergo chemical dimensional changes that are functions of the metal oxide oxygen stoichiometry. At isothermal conditions, an article made of mixed conducting metal oxide material will increase in dimensions with decreasing oxygen stoichiometry. At isothermal conditions, the oxygen stoichiometry decreases with decreasing oxygen partial pressure. Since the equilibrium oxygen stoichiometry increases with decreasing temperature, an article made of mixed conducting metal oxides will contract due to both thermal and chemical dimensional changes as the temperature decreases at a constant oxygen partial pressure. Conversely, an article made of mixed conducting metal oxides will expand by both thermal and chemical dimensional changes as the temperature increases at a constant oxygen partial pressure. This is described in an article entitled "Chemical Expansivity of Electrochemical Ceramics" by S. B. Adler in *J. Am. Ceram. Soc.* 84 (9) 2117-19 (2001).

Dimensional changes therefore result from equilibrium oxygen stoichiometry changes in mixed conducting metal oxide materials. Changing the temperature at a constant oxygen partial pressure or changing the oxygen partial pressure at a constant temperature will change the equilibrium oxygen stoichiometry of the mixed conducting metal oxide material. When a mixed conducting metal oxide is used as an ion transport membrane, for example, an oxygen partial pressure difference across the membrane creates a difference in the equilibrium oxygen stoichiometry at each of the two surfaces of the membrane, which in turn creates the thermodynamic driving force for oxygen ions to diffuse through the membrane.

During startup or shutdown of a gas separation system using mixed conducting metal oxide membranes, the temperature is increased or decreased and the oxygen partial pressure on one or both sides of the membrane may change. The equilibrium oxygen stoichiometry of the membrane material will change in response to the changes in temperature and oxygen partial pressure. Oxygen anions will diffuse into or out of the membrane material and the membrane material will approach its equilibrium oxygen stoichiometry value. As the oxygen stoichiometry and temperature changes, the dimension of the membrane will change. The time required for the membrane to reach chemical equilibrium with the oxygen partial pressures on the surfaces of the membrane will depend on the oxygen anion diffusion rate into or out of the membrane. The time required for equilibration to occur is a function of the material composition, the temperature, and the dimensions of the membrane modules.

Different membrane compositions will have different oxygen anion diffusivities, and compositions with higher diffusivities will equilibrate with the gas phase faster, all other factors being equal. For a given membrane composition, the oxygen anion diffusivity increases exponentially with temperature. Therefore, equilibration times decrease with increasing temperature. Finally, the equilibration time increases approximately with the square of the characteristic dimension (e.g., length or thickness) of the parts in the membrane modules. Therefore, thinner parts will equilibrate faster than thicker parts, all other factors being equal. As the thickness of a part increases and as the temperature decreases, it becomes increasingly difficult to keep the interior of the part in equilibrium with the gas phase due to sluggish diffusion of oxygen anions into or out of the part.

It is known that temperature gradients in a mixed conducting metal oxide ceramic part can create differential strains due to differential thermal expansion and contraction. Similarly, oxygen stoichiometry gradients in a ceramic part can create differential strains due to differential chemical expansion and contraction. This gradient in oxygen stoichiometry may be sufficiently large to create a correspondingly large differential chemical expansion, and therefore large mechanical stresses, that lead to failure of the part. Therefore, it is desirable to avoid differential chemical expansion or at least to control the differential chemical expansion to below maximum allowable values.

There is a need in applications of mixed conducting metal oxide ceramics for methods to heat or cool ceramic articles at faster rates without producing unacceptable strains in the articles. However, few solutions have been proposed to solve this problem to date. In one approach, U.S. Pat. No. 5,911,860 discloses the use of composite membranes containing mechanically enhancing constituents such as metals to improve the mechanical properties of mixed conducting metal oxide membranes. Membranes are disclosed that have a matrix material which conducts at least one type of ion, preferably oxygen ions, and at least one constituent which is physically distinct from the matrix material and which enhances the mechanical properties, the catalytic properties, and/or the sintering behavior of the matrix material. The constituent is present in a manner which precludes continuous electronic conductivity through the constituent across the membrane. In a preferred embodiment the matrix material is a mixed conductor which exhibits both electronic and oxygen ion conductivity. The constituent preferably is a metal such as silver, palladium, or a mixture thereof. In other embodiments, the constituent is a ceramic or other electrically nonconductive material. These proposed membrane compositions thus have mechanical properties that allow faster heating and cooling than membrane compositions previously known in the art.

In an article entitled "Prospects and Problems of Dense Oxygen Permeable Membranes", *Catalysis Today* 56, (2000) 283-295, P. V. Hendricksen et al describe the problem of mechanical failure of mixed conductor membranes under oxygen partial pressure gradients at steady state operating conditions. It is disclosed that oxygen partial pressure gradients will produce differential chemical expansion that can lead to mechanical failure of the membrane. It is proposed that surface kinetic resistances will decrease the maximum tensile stress in a membrane, especially as the membrane thickness is decreased. Therefore, using thin membranes that have surface kinetic resistances may reduce the maximum tensile stress. However, while the surface kinetic resistances may reduce the maximum tensile stress, the surface kinetic resistances will also decrease the oxygen flux obtained from the membrane, and this in turn would increase the membrane area required for a given oxygen production rate and hence decrease the economic benefit of the membrane process.

U.S. Pat. No. 5,725,965 teaches the use of functionally gradient, compositionally layered, solid state electrolytes and membranes to prevent chemical reduction of membrane layers during operation. This layered membrane structure may reduce the differential chemical expansion during steady state operation but does not address the problem of chemical dimensional changes caused by heating or cooling of the membrane structure.

There is a need in the art for improved methods to reduce the potential for mechanical damage due to dimensional changes during the heating and cooling of articles and systems fabricated from mixed conducting metal oxide materials, particularly in the operation of membrane gas separation and reactor systems under transient values of temperature, pressure, and gas composition. There also is a need for new methods to allow rapid startup and shutdown of these systems. These needs are addressed by embodiments of the invention disclosed below and defined by the claims that follow.

BRIEF SUMMARY OF THE INVENTION

An embodiment of the invention relates to a method of operating an oxygen-permeable mixed conducting membrane having an oxidant feed side and a permeate side, which method comprises controlling the differential strain between the oxidant feed side and the permeate side by varying the oxygen partial pressure on either or both of the oxidant feed side and the permeate side of the membrane while changing the temperature of the membrane from a first temperature to a second temperature. The first temperature may be greater than the second temperature; alternatively, the first temperature may be less than the second temperature.

The oxygen partial pressure may be controlled on either or both of the oxidant feed side and the permeate side of the membrane by varying either or both of the oxygen mole fraction and the total gas pressure on either or both of the oxidant feed side and the permeate side of the membrane, respectively. Alternatively, the oxygen partial pressure on the permeate side of the membrane may be controlled by (a) contacting the permeate side of the membrane with a gaseous mixture comprising one or more reducing gases selected from CO, $H_2$, and $CH_4$, and one or more oxygen-containing gases selected from $CO_2$ and $H_2O$ and (b) varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

The mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w > 0.95$ and $\delta$ is a number which renders the composition charge neutral.

Another embodiment of the invention is directed to a method of operating an oxygen-permeable mixed conducting membrane having an oxidant feed side and a permeate side and comprises
(a) heating the membrane to a first temperature and contacting the feed side with a dioxygen-containing gas;
(b) determining the oxygen partial pressure on the feed and permeate sides of the membrane;
(c) determining the differential strain between the feed side and the permeate side of the membrane at the first temperature; and
(d) maintaining the differential strain between the feed and permeate sides during cooling at a value substantially equal to the differential strain determined in (c) or at a value or values within a selected range of values while cooling the membrane module.

The differential strain may be maintained by varying the oxygen partial pressure on either or both of the oxidant feed side and the permeate side of the membrane. The oxygen partial pressure on either or both of the oxidant feed side and the permeate side of the membrane may be controlled by varying either or both of the oxygen mole fraction and the total pressure on either or both of the oxidant feed side and the permeate side of the membrane, respectively. Alternatively, the oxygen partial pressure on the permeate side of the membrane may be controlled by (a) contacting the permeate side of the membrane with a gaseous mixture comprising one or more reducing gases selected from CO, $H_2$, and $CH_4$ and one or more oxygen-containing gases selected from $CO_2$ and $H_2O$ and (b) varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. Alternatively, the mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. More specifically, the mixed conducting metal oxide material may have the general stoichiometric composition $La_{0.4}Sr_{0.6})_wCoO_{3-\delta}$ wherein $1.05 \geq w > 0.95$ and $\delta$ is a number which renders the composition charge neutral.

An alternative embodiment of the invention relates to a method of operating a mixed conducting membrane oxygen recovery system comprising (a) providing at least one membrane module comprising a membrane made of mixed conducting metal oxide material, wherein the membrane module has an oxidant feed side and a permeate side;

(b) heating the membrane and membrane module to a first temperature, contacting the oxidant feed side with an oxygen-containing gas, and withdrawing an oxygen-enriched gas from the permeate side; and (c) controlling the differential strain between the oxidant feed side and the permeate side by varying the oxygen partial pressure on either or both of the oxidant feed side and the permeate side of the membrane module while cooling the membrane and the membrane module.

In this alternative embodiment, the mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

The mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w > 0.95$, and $\delta$ is a number which renders the composition charge neutral.

The oxygen partial pressure on either or both of the oxidant feed side and the permeate side of the membrane may be controlled by varying either or both of the oxygen mole fraction and the total pressure on either or both of the oxidant feed side and the permeate side of the membrane, respectively.

Another alternative embodiment of the invention includes a method of operating a mixed conducting membrane hydrocarbon oxidation system, which method comprises (a) providing at least one membrane module comprising a membrane made of mixed conducting metal oxide material, wherein the membrane module has an oxidant feed side and a permeate side;

(b) heating the membrane and membrane module to a first temperature, introducing an oxygen-containing gas into the oxidant feed side of the membrane module, introducing a hydrocarbon-containing gas into the permeate side of the membrane module, and withdrawing a hydrocarbon oxidation product from the permeate side of the membrane module; and (c) controlling the differential strain between the oxidant feed side and the permeate side by varying the oxygen partial pressure on either or both of the oxidant feed side and the permeate side of the membrane while cooling the membrane and membrane module.

The hydrocarbon-containing gas may comprise methane and the hydrocarbon oxidation product may comprise hydrogen and carbon monoxide. The differential strain may be maintained by varying either or both of the oxygen mole fraction and the total gas pressure on either or both of the oxidant feed side and the permeate side of the membrane.

The oxygen partial pressure on the oxidant feed side may be controlled by varying the oxygen mole fraction on the oxidant feed side. Alternatively, the oxygen partial pressure on the permeate side of the membrane may be controlled by (a) contacting the permeate side of the membrane with a gaseous mixture comprising one or more reducing gases selected from CO, $H_2$, and $CH_4$ and one or more oxygen-containing gases selected from $CO_2$ and $H_2O$, and (b) varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. More specifically, the mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

A related embodiment of the invention relates to a mixed conducting membrane system comprising (a) a membrane module having a membrane comprising mixed conducting metal oxide material, wherein the membrane module has an oxidant feed side and a permeate side;

(b) means for heating and cooling the oxidant feed side and the permeate side of the membrane module;

(c) means for controlling the oxygen partial pressure on either or both of the oxidant feed side and the permeate side of the membrane module.

The means for controlling the oxygen partial pressure on either or both of the oxidant feed side and the permeate side of the membrane module may comprise either or both of (1) means for varying the oxygen mole fraction and (2) means for varying the total gas pressure. The means for controlling the oxygen partial pressure on the permeate side of the membrane module may comprise (1) means for contacting the permeate side of the membrane with a gaseous mixture comprising one or more reducing gases selected from CO, $H_2$, and $CH_4$ and one or more oxygen-containing gases selected from $CO_2$ and $H_2$ and (2) means for varying the composition of the gaseous mixture and optionally the total gas pressure on the permeate side of the membrane.

The mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral. More specifically, the mixed conducting metal oxide material may have the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral. Alternatively, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral. More specifically, the mixed conducting metal oxide material may have the general stoichiometric composition $(La_{0.4}Sr_{0.6})_wCoO_{3-\delta}$ wherein $1.05 \geq w > 0.95$ and $\delta$ is a number which renders the composition charge neutral.

DETAILED DESCRIPTION OF THE INVENTION

Figure 1:
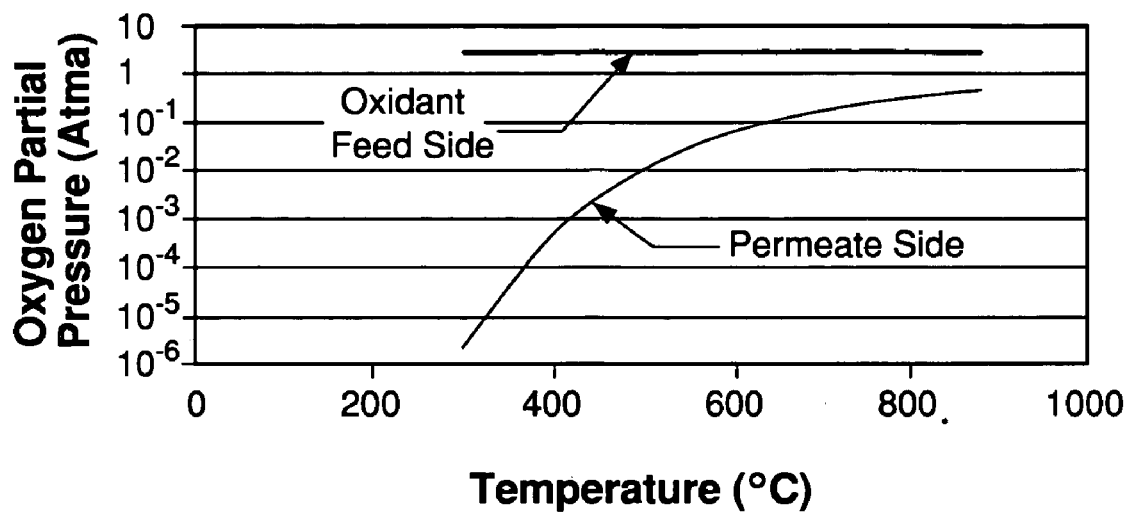
FIG. 1 is a plot of oxygen partial pressure vs. temperature profiles during the cooling of a mixed conducting metal oxide membrane according to an embodiment of the present invention as illustrated in Example 1.

During thermal transients under constant oxygen partial pressures, mixed conducting metal oxide materials expand due to the evolution of oxygen from the solid lattice structure or contract due to the incorporation of oxygen into the solid. This phenomenon is known as chemical expansion. If the material is in the form of a membrane and the thermal transients occur too quickly, thicker parts of the membrane may not equilibrate rapidly enough with oxygen in the gas phases on the oxidant feed side and the permeate side of the membrane, and the membrane material will tend to expand or contract near the surfaces at a different rate than the material in the membrane interior. This will cause differential strains between the surfaces and the internal region of the membrane, and if the membrane cannot immediately change dimensions, this will produce mechanical stresses within the membrane that may cause the membrane to crack. This problem is magnified when the membrane is constrained within the membrane module structure, which reduces the ability of the membrane to change dimensions.

At constant temperature, oxygen will be incorporated into the solid lattice structure when the oxygen partial pressure increases and the membrane material will contract. Also, at constant temperature, oxygen will be evolved from the solid lattice structure when the oxygen partial pressure decreases and the membrane material will expand. If an oxygen partial pressure gradient is imposed across a mixed conducting metal oxide membrane by increasing the oxygen partial pressure on the first side of the membrane relative to the second side, oxygen will be incorporated into the lattice structure of the membrane on the first side exposed to the higher oxygen partial pressure. The first side of the membrane will tend to contract due to the incorporation of the oxygen into the lattice structure of the membrane material. If the membrane is constrained in the membrane module such that contraction cannot occur, a tensile stress will occur on the first side of the membrane and a corresponding compressive stress will occur on the second side of the membrane. If the magnitude of the tensile stress is large enough, the membrane may crack.

As used herein, the generic term "oxygen" includes all forms of oxygen comprising the element or moiety having an atomic number of 8. The generic term oxygen therefore includes oxygen ions, gaseous oxygen (dioxygen or $O_2$), and oxygen that exists in compounds in the gaseous, liquid, or solid state. An oxygen-containing gas is defined as a gas or gas mixture that includes, but is not limited to, one or more components selected from the group consisting of air, nitrogen, $O_2$, water, carbon monoxide, carbon dioxide, nitric oxide (NO), and nitrous oxide ($N_2O$). The term "oxygen partial pressure" as used herein means the partial pressure of dioxygen or $O_2$ in a gas mixture containing $O_2$ and other gaseous components. The term "activity" as used herein is the thermodynamic function, a, having the usual definition (see, for example, *Thermodynamics*, G. N. Lewis and M. Randall, revised by K. S. Pitzer and L. Brewer, $2^{nd}$ Edition, McGraw-Hill, 1961, pp 242-249).

One method to prevent the stresses that arise in membranes due to solid state oxygen gradients is to control the gas phase oxygen partial pressure so that the stoichiometric composition of the membrane material remains constant during heating and cooling. This method is defined as isocompositional heating and cooling. In isocompositional heating and cooling, the oxygen partial pressure on both sides of the membrane is varied along with the temperature so that the gas phase activity is essentially equal to the solid phase oxygen activity, thereby effecting chemical equilibrium between the gas and solid phases. When the gas phase and the solid phase are in chemical equilibrium, oxygen will not pass into or out of the membrane. Since oxygen does not pass into or out of the membrane, no gradients in oxygen vacancy concentration will occur in the membrane. As a result, since there are no oxygen vacancy gradients within the membrane, there will be no strain in the membrane due to differential chemical expansion.

Isocompositional heating and cooling requires that the feed and permeate sides of the membrane be at the same oxygen activity. However, during actual membrane operation, the feed and permeate sides are at different oxygen partial pressures and activities. Therefore, in the transition from an isocompositional condition to an operational condition (or conversely from an operational condition to an isocompositional condition), the oxygen partial pressures on one or both sides of the membrane must be changed. This change in the oxygen partial pressure will produce a differential strain between the feed and permeate sides of the membrane for the reasons described above. However, because the membrane is constrained, it cannot immediately change shape in response to the compositional change of the membrane material. This will generate a stress in the membrane, and if the stress is large enough, the membrane may fail.

This stress occurs because the membrane cannot immediately change shape, i.e., cannot exhibit the strain that would occur if the membrane were not constrained. The oxygen partial pressure may be changed slowly enough to allow the membrane to creep, i.e., to change shape slowly, which relaxes the chemical expansion stresses within the membrane. Stress relaxation would be a workable solution to the problem of stress buildup in membranes; however, creep can be a slow process, and this would seriously increase the time required for startup or shutdown of a membrane module.

Another possible disadvantage of using a creep relaxation step is that the membrane may suffer damage during creep. There are several different creep mechanisms, one of which is grain boundary sliding wherein the grains of the ceramic slide past each other to allow the membrane to change shape slightly and relieve the stress within the membrane. As the grains slide past each other, cavities may form at the grain boundaries, and these cavities will tend to weaken the ceramic. This damage may be cumulative, and the size and/or number of cavities may increase with increasing numbers of creep relaxation cycles. Other creep mechanisms also can produce damage that may weaken the ceramic. The subject of creep of ceramics is reviewed, for example, by W. Cannon and T. Langdon in *Journal of Materials Science* (18), 1983, pp. 1-50.

The embodiments of the present invention described below avoid or minimize creep relaxation by controlling the oxygen partial pressure in a specific manner during heating and cooling so that stress buildup in the membrane is eliminated or controlled within an acceptable range. Because stress is difficult to measure or calculate in mixed conducting metal oxide membranes, the embodiments of the present invention are defined in terms of the differential strain that would occur immediately as a result of stoichiometric composition changes in the membrane if the membrane were not constrained. As explained above, the differential strain due to stoichiometric composition changes in the membrane actually occurs slowly as the membrane creeps and changes shape to relax the initial stresses caused by chemical expansion and/or contraction.

The term "differential strain" as used herein means the difference between the strain in the membrane material on one side of the membrane and the strain in the membrane material on the other side of the membrane that would occur in an unconstrained membrane due to changes in the stoichiometric compositions of the membrane material on one or both sides of the membrane at a given temperature. Thus when the stoichiometric compositions of the membrane material on both sides of the membrane are equal at a given temperature, the differential strain is zero. When the stoichiometric compositions of the membrane material are different on each side of the membrane at a given temperature, the differential strain will be non-zero and may have either a positive or negative value depending on actual membrane geometry, membrane stoichiometry, and gas compositions.

The term "crept differential strain" means the differential strain between the membrane material on either side of the membrane, wherein the membrane has a different stoichiometric composition on each side that would occur in an actual constrained membrane after a period of time sufficient for creep to reach a stable value. The crept differential strain may reach zero or more typically may reach a positive or negative residual value. The residual stress resulting from the crept differential strain may be zero or may have non-zero values wherein a residual stress profile exists within the membrane. The term "uncrept differential strain" means the differential strain that would occur in a constrained membrane before any creep occurs to reduce the stress.

The term "membrane" as used herein includes any planar or non-planar membrane comprising mixed conducting metal oxide material. The membrane may have a composite structure wherein a dense layer of mixed conducting metal oxide material is bonded to the surface of a porous support of mixed conducting metal oxide material. The mixed conducting metal oxide material of the dense layer and the porous support may be the same or different. When the mixed conducting metal oxide material of the dense layer and the porous support are the same, the strain in the dense layer adjacent the first side of the porous support is the same as the strain in the first side of the porous support adjacent the dense layer. The mixed metal oxide material possesses both oxygen ion conductivity and electronic conductivity at elevated temperatures and the membrane requires no attached electrodes to transfer electrons to or from the membrane.

The term "stress" has the usual meaning of a force or system of forces that tends to strain or deform a body. In membrane materials, these forces are caused by the chemical expansion or contraction due to stoichiometric composition changes in the membrane as earlier described. The term "strain" has the usual meaning of a deformation produced by a stress. Strain in mixed conducting metal oxide materials is defined as the difference between (1) a dimension of an article or body at selected conditions of temperature, total gas pressure, and gas composition and (2) the dimension at a set of reference conditions of temperature, total gas pressure, and gas composition. Strain is defined as the ratio $(D_s-D_r)/D_r$ where $D_s$ is the dimension at the selected conditions and $D_r$ is the dimension at the reference conditions. Differential strain may be expressed in relative dimensionless units of parts per million (ppm).

The temperature of the membrane may increase or decrease for any reason. For example, the temperature of the membrane is increased during startup from ambient temperature to operating temperature and is decreased during shutdown from operating temperature to ambient temperature. Alternatively, the temperature of the membrane may be increased or decreased during operation from a first operating temperature to a second operating temperature as required for process reasons. The operating temperature of the membrane may change, for example, in response to changes in the temperature and/or composition of the gas at the oxidant feed side and/or the permeate side of the membrane. Embodiments of the present invention may be applied during any of these temperature changes.

A membrane typically is installed in a module forming at least two gas passages separated by the membrane, wherein a passage is formed on the oxidant feed side of the membrane and another passage is formed on the permeate side of the membrane. The oxidant feed side of the membrane is defined as the side that is contacted with a dioxygen-containing gas and the permeate side is defined as the other side of the membrane at which permeated oxygen is evolved or is reacted with a hydrocarbon-containing gas. The passage on the oxidant feed side has an inlet and an outlet adapted to provide gas contact with the membrane and gas withdrawal from the membrane. The passage on the permeate side of the membrane has an outlet and also may have an inlet.

Embodiments of the present invention may be applied to a membrane system designed and operated for oxygen recovery in which permeated oxygen is withdrawn from the permeate side of the membrane. The membrane system may be operated to recover a high-purity oxygen product from a dioxygen-containing gas such as air; a sweep gas may be used on the permeate side if desired. Alternatively, the system may be used to purify a gas containing oxygen as an impurity and may utilize a sweep gas on the permeate side. In these embodiments, the permeate side of the membrane may have an outlet but no inlet; alternatively, the permeate side of the membrane may have both an inlet and an outlet.

In another embodiment, the system may be operated as an oxidation or partial oxidation reactor in which permeated oxygen is reacted on the permeate side with a hydrocarbon-containing gas to yield hydrocarbon oxidation or partial oxidation products. For example, natural gas may be introduced into the permeate side of the membrane module and react therein with oxygen to form synthesis gas comprising hydrogen and carbon monoxide. In this embodiment, the permeate side of the membrane typically has both an inlet and an outlet.

In all of these embodiments, the oxidant feed side of the membrane is defined as the side that is contacted with a dioxygen-containing gas and the permeate side is defined as the other side of the membrane at which permeated oxygen is evolved or is reacted with a hydrocarbon-containing gas.

The temperatures at all points in the membrane during operation may not be equal and temperature profiles may exist between any two points within or on the surface of the membrane. For this reason, the terms "temperature of the membrane" and "membrane temperature", as well as any uses of the term "temperature" in reference to the membrane, mean the average temperature of the membrane. In the present disclosure, the average temperature of the membrane in a module is defined generically as the arithmetic average of the gas temperatures at (1) the oxidant feed side inlet, (2) the oxidant feed side outlet, (3) the permeate side at a location across the membrane opposite the oxidant feed side inlet, and (4) the permeate side outlet. For embodiments in which the permeate side has both an inlet and an outlet, the average temperature of the membrane in a module is defined as the arithmetic average of the gas temperatures at (1) the oxidant feed side inlet, (2) the oxidant feed side outlet, (3) the permeate side inlet, and (4) the permeate side outlet.

Embodiments of the invention described herein thus include a method of operating an oxygen-permeable mixed conducting membrane having an oxidant feed side and a permeate side, wherein the method comprises controlling the differential strain between the oxidant feed side and the permeate side by controlling the gas phase oxygen activities on either or both sides of the membrane while the temperature of the membrane changes from a first temperature to a second temperature. The gas phase oxygen activities may be controlled by varying either or both of the oxygen partial pressure and the total gas pressure on either or both of the oxidant feed side and the permeate side of the membrane. The oxygen partial pressure may be controlled by varying the concentration of dioxygen ($O_2$) in the gas phase. The gas phase may be a mixture comprising nitrogen or other inert gas and dioxygen ($O_2$); alternatively, the gas phase may be a mixture of gaseous components which form equilibrium amounts of dioxygen ($O_2$) at elevated temperatures. In this alternative, the oxygen partial pressure on the permeate side of the membrane may be controlled by (a) contacting the permeate side of the membrane with a gaseous mixture comprising one or more reducing gases selected from CO, $H_2$, and $CH_4$ and one or more oxygen-containing gases selected from $CO_2$ and $H_2O$, and (b) varying the composition of the gaseous mixture and optionally the total gas pressure on the permeate side of the membrane. For example, the mixture of gaseous components may include hydrogen and water. Alternatively, the mixture of gaseous components may include $H_2$, CO, and $H_2O$. In another alternative, the mixture of gaseous components may include CO and $CO_2$.

An embodiment of the invention may be described as a method of operating an oxygen-permeable mixed conducting membrane having an oxidant feed side and a permeate side, wherein the method comprises heating the membrane to a first temperature and contacting the feed side with a dioxygen-containing gas; determining the oxygen partial pressure on the feed and permeate sides of the membrane; determining the differential strain between the feed side and the permeate side of the membrane at the first temperature; and maintaining the differential strain between the feed and permeate sides during cooling at a selected value while cooling the membrane. Alternatively, the differential strain may be maintained at a value or values within a selected range of values.

During steady state operation of an actual membrane module at elevated temperature, the membrane may be characterized by a differential strain as earlier defined, wherein the differential strain is the strain that would occur in an unconstrained membrane as a result of differences in the stoichiometric compositions of the membrane material on either side of the membrane at the steady state operating conditions. After sufficient time at these actual operating conditions, the stress in the actual constrained membrane due to chemical expansion will relax due to creep as the membrane slowly changes shape and approaches the equilibrium condition of crept differential strain earlier defined. It is desirable to maintain this relaxed chemical expansion stress state and the related crept differential strain when the membrane system is cooled during shutdown and subsequently heated again during startup. It is undesirable to generate new differential strain during cooling and heating at uncontrolled conditions. Controlling the differential strain in the membrane according to embodiments of the invention allows faster startup and shutdown of the membrane system and avoids or minimizes creep damage to the membrane during subsequent shutdown-startup cycles.

In order to minimize or eliminate the generation of new differential strain and the accompanying creep damage during successive cycles of heating and cooling of the membrane, the oxygen partial pressures and activities on both sides of the membrane may be adjusted during cooling from operating conditions to maintain the same constant chemical expansion differential strain across the membrane or to control changes in the chemical expansion differential strain within acceptable limits. This will allow the membrane to be heated or cooled rapidly, and slow oxygen partial pressure transients will not be required to allow creep relaxation of chemical expansion strains. When no creep relaxation steps are used, no cumulative creep damage to the membrane will occur. In some embodiments of the invention, slight creep relaxation may be acceptable if controlled within certain limits.

The control of differential strain in operating membrane modules during heating and cooling may be effected by independent control of the oxygen activities on the oxidant feed and permeate sides of the membranes. This may be accomplished by placing the oxidant feed and permeate sides of the membranes in flow communication with separate gas sources and/or under separate control of the total pressure in the gas phase. Typically, specifications of the required piping and gas flow control systems for these purposes are included in the design of the membrane modules and the process pressure vessel in which the modules are installed.

Control of the gas atmosphere during the heating of newly-manufactured mixed conducting metal oxide membrane modules in the initial startup phase will be determined by the module manufacturing conditions. For example, the manufactured modules may be in an isocompositional condition in which the oxygen vacancy concentration is constant throughout the module material. The manufactured modules may have been cooled under constant oxygen activity conditions from the manufacturing conditions used for sintering and ceramic-to-ceramic sealing. Therefore, during the heating of a new module during initial startup, the prior manufacturing history of the module will dictate the control of heating and oxygen partial pressure gradients across the membrane. If isocompositional cooling was used in the last processing step in module manufacturing, then isocompositional heating may be used to bring the module to operating temperature during initial startup.

At the end of the isocompositional heating step during initial startup, the oxygen partial pressure on both sides of the membrane will be equal. To establish the oxygen partial pressure gradient across the membrane required for oxygen permeation, the oxygen partial pressure on one or both sides of the membrane is changed in a controlled manner. The rate of oxygen partial pressure change may be controlled slowly to allow creep relaxation, or partial creep relaxation, of any chemical expansion strain created during the oxygen partial pressure changes. When the changes in the oxygen partial pressure or pressures are complete, the membrane will be at the desired operating conditions of temperature and oxygen partial pressure gradient cross the membrane. Since an oxygen activity gradient exists across the membrane, the membrane will experience differential strain due to chemical expansion, and stress will occur as a result. This stress will relax slowly due to creep and after sufficient operating time may eventually reach very low levels. It is desirable to maintain this relaxed chemical expansion stress state during subsequent shutdown and startup cycles as mentioned earlier, and this may be accomplished by embodiments of the present invention.

This relaxed chemical expansion stress state may be controlled by maintaining a constant differential strain across the membrane during all subsequent thermal transients. By maintaining a constant differential strain, the stress due to that strain will remain at the very low relaxed chemical expansion stress state produced by creep at the initial steady-state operating conditions. A constant differential strain during the shutdown of the membrane from operating conditions may be maintained by controlling the oxygen activity on one or both sides of the membrane to maintain the differential strain across the membrane at a desired value or within a desired range of values. Since the differential strain is maintained, no new stresses will be generated due to chemical expansion during cooldown from the membrane operating temperature. No creep relaxation steps will be required before or during cooling, and therefore additional creep damage to the membrane will not occur.

On subsequent heating of the modules from ambient conditions to operating conditions, the oxygen partial pressure again may be controlled to maintain the differential strain at the same constant value. This may be accomplished by following the same oxygen partial pressure-temperature profile that was followed during the prior cooldown step. All subsequent thermal cycles may utilize the same oxygen partial pressure-temperature profile to maintain the differential strain at a constant value.

In some instances, it may be advantageous to maintain the magnitude of the differential strain within a certain target range or below a target value rather than at a constant value. This may allow the use of simpler control schemes or less expensive process conditions, while still maintaining the advantages of rapid startup and shutdown while minimizing cumulative creep damage during repeated cycles. For example, the differential strain may be maintained at less than 50% of the uncrept differential strain at steady state operating conditions. More specifically, the differential strain may be maintained at less than 25%, and even less than 10%, of the uncrept differential strain at steady state operating conditions.

Stresses and differential stresses in mixed conducting metal oxide membranes may be calculated using relationships determined for each specific mixed conducting metal oxide composition. For example, for the composition $La_{0.4}Sr_{0.6}CoO_{3-\delta}$ the relation among the oxygen partial pressure, temperature, the oxygen vacancy in the membrane material, and the oxygen chemical potential is given by $$\ln(P_{O_2}) = \frac{E_{Ox} - \frac{4}{g(\varepsilon_f)}(6x_v(T^*, 0.21) - x) - TS_{Ox} - 2RT\ln\left(\frac{x_v(T^*, 0.21)}{1 - x_v(T^*, 0.21)}\right) - \mu^0_{O_2}(T)}{RT} \quad (1)$$

where $x_v(T^*,0.21)$ represents the isocompositional oxygen vacancy concentration to be held constant at an isocompositional reference temperature, $T^*$, and a $P_{O_2}$ of 0.21 atma. T is the absolute temperature and R is the ideal gas constant. This equation is described by Martijn H. R Lankhorst, H. J. M. Bouwmeester, and H. Verweij in *Physical Review Letters* (1996), 77(14), pp. 2989-2993.

The chemical potential of oxygen, $\mu^0_{O2}$, is given by:

$$\mu^0_{O_2}(T) = RT\left[-1.225 - \frac{1045}{T} - 3.5\ln(T) + 1.013\ln\left\{1 - \exp\left(\frac{-2242}{T}\right)\right\}\right] \quad (2)$$

where T is the absolute temperature and R is the ideal gas constant. The parameters $E_{Ox}$, $4/g(\varepsilon_f)$, x, and $S_{Ox}$ are given in Table 1 below.

TABLE 1

Oxygen Non-stoichiometry Model Parameters.

| Parameter | Value | Units |
| --- | --- | --- |
| $E_{Ox}$ | −201283 | J/mol |
| $1/g(\varepsilon_f)$ | 44684 | J/mol |
| x | 0.6 | |
| $S_{Ox}$ | 139.6 | J/(mol K) |

Equations (1) and (2) above together describe the relationship among the oxygen partial pressure $P_{O_2}$, the oxygen vacancy concentration $x_v$, and the absolute temperature T for the composition $La_{0.4}Sr_{0.6}CoO_{3-\delta}$.

The chemical expansion strain depends on the general composition of the mixed metal oxide material, and each metal oxide material has characteristic chemical expansion strain behavior. This is determined experimentally and may be correlated empirically as a function of temperature and oxygen vacancy concentration. The differential strain also may be correlated empirically. For example, the differential strain for mixed conducting metal oxide material having the general composition $La_{0.4}Sr_{0.6}CoO_{3-\delta}$ can be correlated by the following empirical equation $$\text{Differential strain(ppm)} = 93.355(x_v^{Permeate} - x_v^{Feed})(T - 26° C.) \quad (3)$$

where $x_v^{Permeate}$ and $x_v^{Feed}$ are the oxygen vacancy concentrations on the permeate and oxidant feed sides of the membrane, respectively, and T is the temperature in degrees Centigrade.

Embodiments of the invention may be practiced in the operation of membrane modules fabricated from a variety of mixed conducting metal oxide materials. For example, the mixed conducting metal oxide material may have the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

A more specific stoichiometric composition may have the general stoichiometric composition $(La_xCa_{1-x})_wFeO_{3-\delta}$ wherein $1.0 > x > 0.5$, $1.1 \geq w \geq 1.0$, and $\delta$ is the number which renders the composition charge neutral. In another embodiment, the mixed conducting metal oxide material may have the general stoichiometric composition $(La_xSr_{1-x})_wCoO_{3-\delta}$ wherein $1.0 > x > 0.1$, $1.05 \geq w > 0.95$, and $\delta$ is the number which renders the composition charge neutral. In a more specific embodiment, the mixed conducting metal oxide material may have the general stoichiometric composition $(La_{0.4}Sr_{0.6})_wCoO_{3-\delta}$ wherein $1.05 \geqq w > 0.95$ and $\delta$ is the number which renders the composition charge neutral.

Heating and cooling rates used in the embodiments of the invention typically are in the range of 0.25° C./min to 10° C./min and may be in the range of 0.5° C./min to 5° C./min.

The following Examples illustrate embodiments of the present invention but do not limit the invention to any of the specific details described therein.

EXAMPLE 1

A membrane module comprises membranes made of a mixed conducting metal oxide having a composition of $La_{0.4}Sr_{0.6}CoO_{3-\delta}$, wherein $\delta$ is the number that renders the compound charge neutral and is related to the oxygen vacancy in the solid lattice. The membrane is operated at 875° C., the feed to the membrane is a dioxygen-containing gas having an oxygen partial pressure of 2.8 atma, and the permeate is assumed to be pure oxygen at a partial pressure and a total pressure of 0.46 atma. Under these conditions, the differential strain between the feed and permeate side of the membrane is determined to be 939 ppm using equations (1), (2), and (3). After a sufficiently long operating period at 875° C. (typically several weeks), the stress due to this differential strain will have relaxed to very low values, typically less than 1 MPa, and the membrane will have slightly changed shape due to creep.

In this example, the membrane module is cooled while holding the feed side oxygen partial pressure constant at 0.21 atma and adjusting the permeate side oxygen partial pressure to maintain a constant differential strain of 939 ppm between the feed and permeate sides of the membrane as the temperature is reduced. This is done by using the chemical expansion model described above in equations (1) and (2) and using the empirical equation (3) to calculate the desired permeate side oxygen partial pressure as a function of temperature required to maintain a constant differential strain of 939 ppm.

The desired oxygen partial pressures are provided on either side of the membrane during cooling from 875° C. by passing air over the oxidant feed side and passing a mixture of nitrogen and air over the permeate side. The dioxygen concentration and oxygen partial pressure of the air-nitrogen mixture on the permeate side is varied during cooling in order to maintain a differential strain of 939 ppm. FIG. 1 shows the resulting partial pressures on the oxidant feed side and the permeate sides of the membrane during cooling from 875° C. to 300° C. at a rate of 1° C./min to maintain the differential strain of 939 ppm.

EXAMPLE 2

Figure 2:
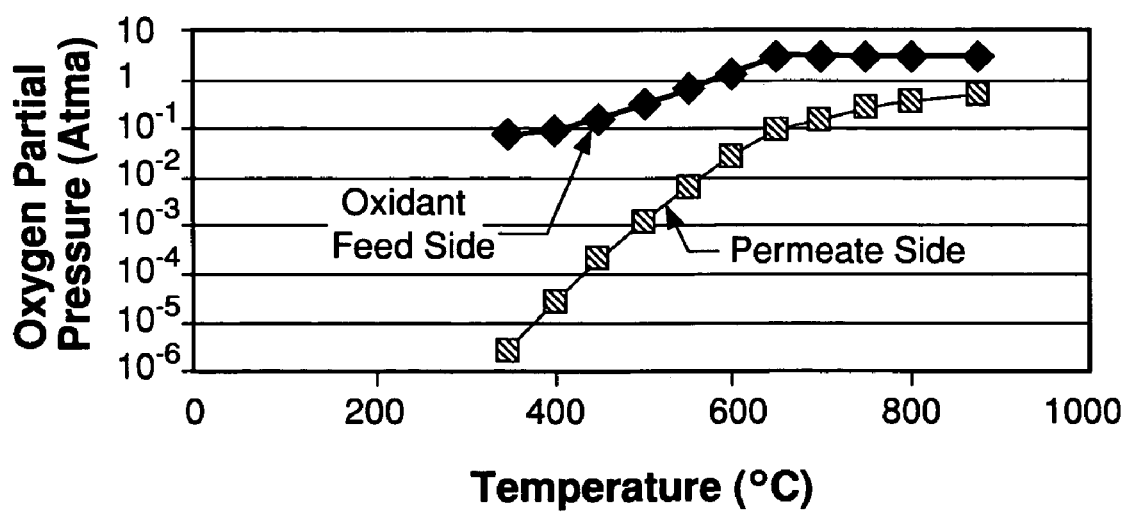
FIG. 2 is a plot of oxygen partial pressure vs. temperature profiles during the cooling of a mixed conducting metal oxide membrane according to another embodiment of the present invention as illustrated in Example 2.

The membrane of Example 1 is cooled from operating conditions of 875° C., an oxidant feed side oxygen partial pressure of 2.8 atma, and a permeate side producing pure oxygen at both partial and total pressures of 0.46 atma. At these operating conditions, the differential strain between the feed and permeate side of the membrane is determined to be 939 ppm. The oxidant feed side oxygen partial pressure is maintained at 2.8 atm while cooling from 875° C. to 650° C. at a rate of 1° C./min and the permeate side oxygen partial pressure is varied during cooling to maintain a constant differential strain of 939 ppm. The required oxygen partial pressure-temperature profile is determined using equations (1), (2), and (3) above. Below 650° C., the permeate side of the membrane is maintained at an isocompositional condition where the permeate side oxygen vacancy fraction, $x_v^{permeate}$, is held constant. The required feed side oxygen partial pressure-temperature profile to maintain the constant differential strain condition over the temperature range from 650° C. to room temperature is calculated using equations (1), (2), and (3) above. Below 250° C., where oxygen transport is very sluggish, the oxygen partial pressures on both side of the membrane are held constant. The calculated oxygen partial pressure-temperature profiles for the oxidant feed and permeate sides of the membrane are given in FIG. 2.

EXAMPLE 3

The membrane of Example 1 is cooled from operating conditions of 875° C., an oxidant feed side oxygen partial pressure of 2.8 atma, and a permeate side producing pure oxygen at both partial and total pressures of 0.46 atma. At these operating conditions, the differential strain between the feed and permeate side of the membrane is determined to be 939 ppm. The oxidant feed side of the membrane is maintained in an isocompositional state during cooling by using an isocompositional oxygen partial pressure-temperature profile and the oxygen partial pressure-temperature profile on the permeate side of the membrane is controlled to maintain a constant differential strain of 939 ppm by the method described in Example 2. Cooling is carried out at a rate of 1° C./min.

The advantage of the embodiment in this example is that the oxygen vacancy fraction of the oxidant feed side of the membrane is kept constant. To maintain the constant differential strain condition, the oxygen vacancy concentration on the permeate-side of the membrane module is increased as the temperature is lowered. This places the surfaces of any internal feature of the module that are unable to equilibrate with the gas phase (i.e., portions having longer length scales) in compression.

EXAMPLE 4

Figure 3:
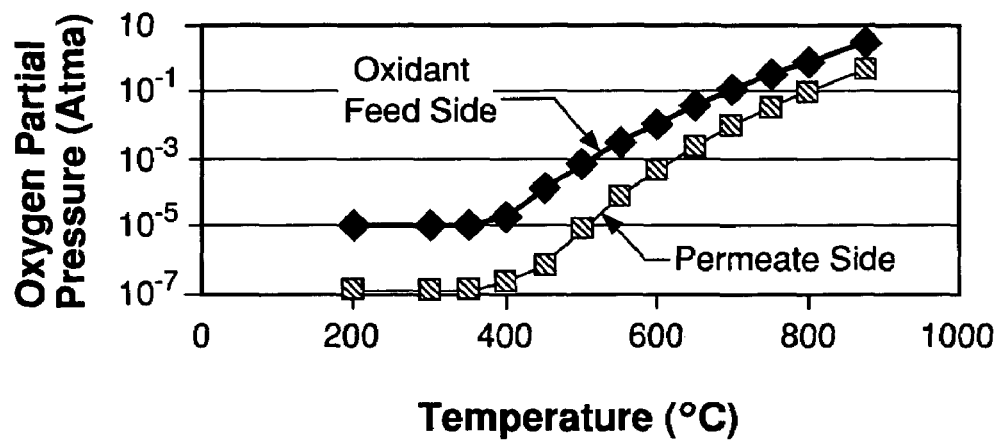
FIG. 3 is a plot of oxygen partial pressure vs. temperature profiles during the cooling of a mixed conducting metal oxide membrane according to an alternative embodiment of the present invention as illustrated in Example 4.
Figure 4:
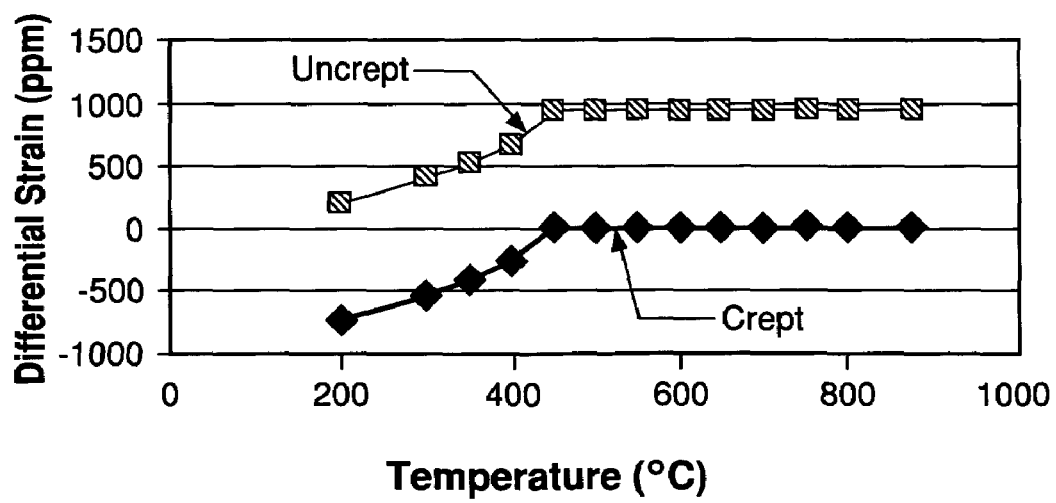
FIG. 4 is a plot of crept and uncrept strain for the membrane during cooling according to the alternative embodiment illustrated in Example 4.

The membrane of Example 1 is cooled from operating conditions of 875° C., an oxidant feed side oxygen partial pressure of 2.8 atma, and a permeate side producing pure oxygen at both partial and total pressures of 0.46 atma. At these operating conditions, the differential strain between the feed and permeate side of the membrane is determined to be 939 ppm. In this example, gases having the same composition but different total pressures are passed over the oxidant feed and permeate sides of the membrane during cooling 875° C. to room temperature. The feed side of the module is maintained at isocompositional conditions (i.e., $x_v^{Feed}$ is kept constant) from 875° C. to 400° C. This is accomplished by decreasing the total pressure of the feed side as the temperature falls from 875° C. to approximately 730° C. while maintaining an oxygen mole fraction of 0.21 and an oxygen partial pressure of 0.21 atma on the oxidant feed side. From approximately 730° C. to approximately 400° C., the feed side total pressure is maintained at 1 atma and nitrogen is blended blending with air to achieve the desired oxygen partial pressure in the oxidant feed side. At 400° C. and below, the oxidant feed side oxygen partial pressure is kept constant at $10^{-5}$ atma. From 875° C. to approximately 750° C., air is blended into the permeate side to achieve a permeate side oxygen mole fraction of 0.21 and an oxygen partial pressure of 0.21 atma. The total pressure is also decreased from 0.46 atma to 0.152 atma. The oxidant feed side and permeate side oxygen mole fractions then are equal for all temperatures below 750° C. Cooling in this example is effected at a rate of 0.5° C./min. FIG. 3 shows the calculated oxygen partial pressure-temperature profiles for the oxidant feed and permeate sides of the membrane.

The differential strain profile was calculated using the equation (3) and the oxygen partial pressures of FIG. 3. The uncrept differential strain was calculated directly using equation (3). The crept differential strain profile was calculated using equation (3) minus the crept differential strain that would occur during a long membrane operating period at a temperature of 875° C., an oxidant feed side oxygen partial pressure of 2.8 atma, and a permeate side producing pure oxygen at a partial pressure and a total pressure of 0.46 atma. The crept differential strain is very small (and may approach zero) after extended operation at high temperatures because creep has relaxed the chemical expansion stress. The crept differential strain remains low as the module is cooled from 875° C. to 400° C. because the low differential strain is maintained by following the proper temperature-oxygen partial pressure profile as described above. The crept strain starts to increase at temperatures below 400° C. because the membrane module does not follow the controlling temperature-oxygen partial pressure profile used between 875° C. and 400° C. By following the controlled temperature-oxygen partial pressure profile for at least part of the cooling step, a lower strain results in the final cooled membrane at room temperature.

EXAMPLE 5

A membrane module comprises membranes made of a mixed conducting metal oxide having a composition of $La_{0.9}Ca_{0.1}FeO_{3-\delta}$, wherein $\delta$ is the number that renders the compound charge neutral and is related to the oxygen vacancy in the solid lattice. The chemical expansion or strain for this membrane material is described by the empirically-determined equation $$\text{Strain(ppm)} = (CCE_0)x_v \quad (4)$$

where $CCE_0$ is the coefficient of chemical expansion of 65269 ppm. The oxygen vacancy fraction, $x_v$, can be approximated by the empirical relations $$x_v = A(P_{O_2})^B \quad (5)$$

and $$x_v = C(P_{O_2})^D \quad (6)$$

where equation (5) applies for $P_{O_2} < 1.75 \times 10^{-3}$ atma and equation (6) applies in the range of 1 atma $> P_{O_2} > 1.75 \times 10^{-3}$ atma. The parameters A, B, C, and D are given by the empirical relations $$\ln(A) = -6958(1/T) + 0.173 \quad (7)$$

$$B = 92.5(1/T) + 0.0329 \quad (8)$$

$$\ln(C) = -16656(1/T) + 6.32 \quad (9)$$

$$D = -1709(1/T) + 1.08 \quad (10)$$

where T is the absolute temperature in ° K, parameter A has the units of $(1/\text{atma})^B$ and parameter C has the units of $(1/\text{atma})^D$.

The differential chemical expansion strain between the feed and permeate sides of the membrane is given by:

$$\text{differential strain(ppm)} = (CCE_0)(x_v^{Permeate} - x_v^{Feed}) \quad (11)$$

where $CCE_0$ is defined above.

The membrane module is operated at 900° C. with an oxygen partial pressure of 0.2 atma on the oxidant feed side. Pressurized natural gas is fed to the permeate side and reacts therein with permeated oxygen, and the permeate side reaction product gas is a mixture of 40 mole % $H_2$, 1.9% $CH_4$, 18.1% CO, 10.2% $CO_2$, 29% $H_2O$ and 0.9% $N_2$ at a pressure of 26 atma. The equilibrium oxygen partial pressure of on the permeate side is $2.7 \times 10^{-17}$ atm is calculated from the equilibrium reactions of all components, including oxygen. Using equations (5) through (11) above, the differential strain across the membrane is calculated to be 1142 ppm at operating conditions.

Figure 5:
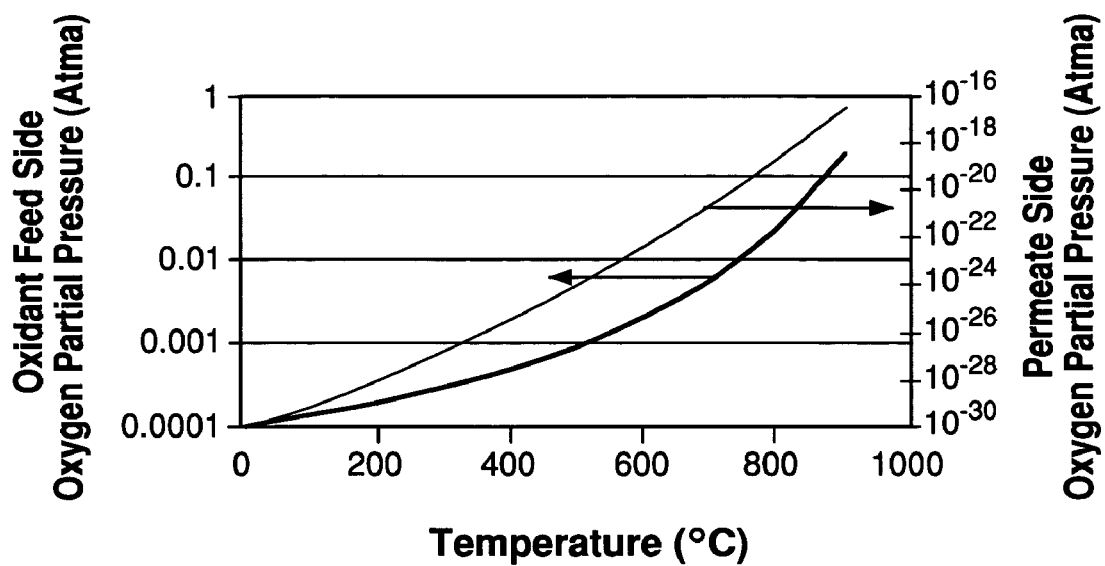
FIG. 5 is a plot of oxidant feed side and permeate side oxygen partial pressures vs. temperature during the cooling of a mixed conducting metal oxide membrane according to a related embodiment of the present invention as illustrated in Example 5.
Figure 6:
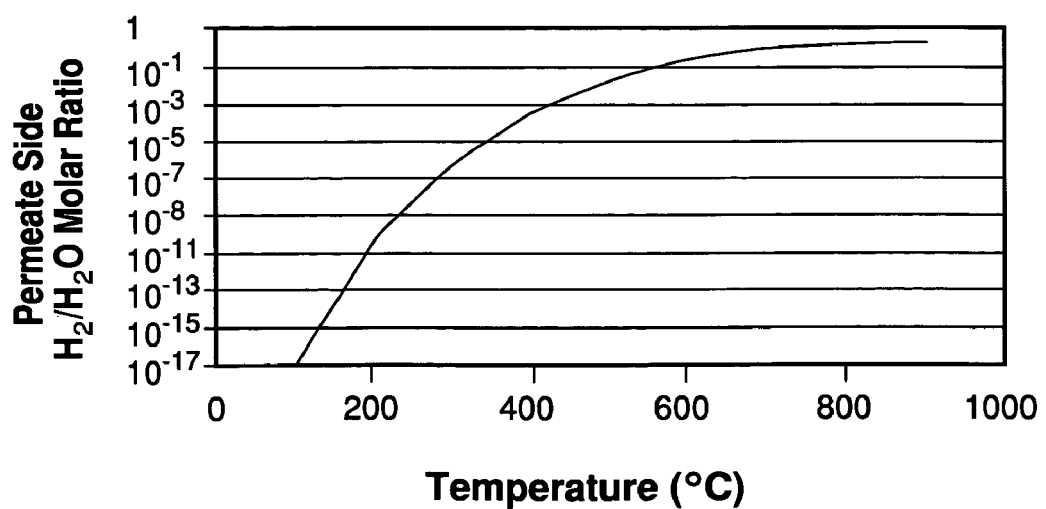
FIG. 6 is a plot of hydrogen/water molar ratio vs. temperature in the embodiment of Example 5 in which the permeate side of the membrane is contacted with a gas mixture comprising hydrogen and water during cooling.

The membrane is cooled at a rate of 0.5° C./min and a constant differential strain in the membrane is maintained by holding the oxygen vacancy fraction on each side of the membrane constant during cooling by decreasing the oxygen partial pressure on each side of the membrane as shown in FIG. 5. These required oxygen partial pressures are calculated using equations (5) through (11). At any given temperature during cooling, therefore, the differential strain is held constant at 1142 ppm by maintaining the oxygen vacancy fraction constant on each side of the membrane. On the feed side of the membrane, nitrogen is blended with air to achieve the desired oxygen partial pressures during cooling. On the permeate (reaction) side of the membrane, the desired oxygen partial pressure is controlled by passing a mixture of hydrogen and water through the permeate side and varying composition of the gas during cooling to achieve the desired $P_{O_2}$. The oxygen partial pressure is calculated from the equilibrium relation $H_2 + \frac{1}{2}O_2 = H_2O$ and the known free energy of formation of the three components. FIG. 6 shows the desired molar ratios of $H_2$ to $H_2O$ as a function of temperature required to achieve the oxygen partial pressures shown for the permeate side in FIG. 5.

The invention claimed is:

1. A method of operating an oxygen-permeable mixed conducting membrane having an oxidant feed side and a permeate side, which method comprises controlling the differential strain between the oxidant feed side and the permeate side by varying the oxygen partial pressure on either or both of the oxidant feed side and the permeate side of the membrane while the temperature of the membrane changes from a first temperature to a second temperature.

2. The method of claim 1 wherein the first temperature is greater than the second temperature.

3. The method of claim 1 wherein the first temperature is less than the second temperature.

4. The method of claim 1 wherein the oxygen partial pressure is controlled on either or both of the oxidant feed side and the permeate side of the membrane by varying either or both of the oxygen mole fraction and the total gas pressure on either or both of the oxidant feed side and the permeate side of the membrane, respectively.

5. The method of claim 1 wherein the oxygen partial pressure on the permeate side of the membrane is controlled by
   (a) contacting the permeate side of the membrane with a gaseous mixture comprising one or more reducing gases selected from CO, $H_2$, and $CH_4$ and one or more oxygen-containing gases selected from $CO_2$ and $H_2O$; and
   (b) varying the composition of the gaseous mixture and optionally the total gas pressure on the permeate side of the membrane.

6. The method of claim 5 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

7. The method of claim 6 wherein the mixed conducting metal oxide material has the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

8. The method of claim 4 wherein the mixed conducting metal oxide material has the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral.

9. The method of claim 8 wherein the mixed conducting metal oxide material has the general stoichiometric composition $(La_{0.4}Sr_{0.6})_wCoO_{3-\delta}$ wherein $1.05 \geq w > 0.95$ and $\delta$ is a number which renders the composition charge neutral.

10. A method of operating an oxygen-permeable mixed conducting membrane having an oxidant feed side and a permeate side, wherein the method comprises
   (a) heating the membrane to a first temperature and contacting the feed side with a dioxygen-containing gas;
   (b) determining the oxygen partial pressure on the feed and permeate sides of the membrane;
   (c) determining the differential strain between the feed side and the permeate side of the membrane at the first temperature; and
   (d) maintaining the differential strain between the feed and permeate sides during cooling at a value substantially equal to the differential strain determined in (c) or at a value or values within a selected range of values while cooling the membrane.

11. The method of claim 10 wherein the differential strain is maintained by varying the oxygen partial pressure on either or both of the oxidant feed side and the permeate side of the membrane.

12. The method of claim 11 wherein the oxygen partial pressure on either or both of the oxidant feed side and the permeate side of the membrane is controlled by varying either or both of the oxygen mole fraction and the total pressure on either or both of the oxidant feed side and the permeate side of the membrane, respectively.

13. The method of claim 10 wherein the oxygen partial pressure on the permeate side of the membrane is controlled by
   (a) contacting the permeate side of the membrane with a gaseous mixture comprising one or more reducing gases selected from CO, $H_2$, and $CH_4$ and one or more oxygen-containing gases selected from $CO_2$ and $H_2O$; and
   (b) varying the composition of the gaseous mixture and optionally the total gas pressure on the permeate side of the membrane.

14. The method of claim 10 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \geq x \geq 1$, $0 \geq y \geq 1$, and $0.95 < w < 1.05$; and wherein $\delta$ is a number that renders the compound charge neutral.

15. The method of claim 14 wherein the mixed conducting metal oxide material has the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

16. The method of claim 14 wherein the mixed conducting metal oxide material has the general stoichiometric composition $(La_xSr_{1-x})_wCoO_{3-\delta}$ wherein $1.0 > x > 0.1$, $1.05 \geq w \geq 0.95$, and $\delta$ is a number which renders the composition charge neutral.

17. The method of claim 16 wherein the mixed conducting metal oxide material has the general stoichiometric composition $(La_{0.4}Sr_{0.6})_wCoO_{3-\delta}$ wherein $1.05 \geq w > 0.95$ and $\delta$ is a number which renders the composition charge neutral.

18. A method of operating a mixed conducting membrane oxygen recovery system, the method comprising
   (a) providing at least one membrane module comprising a membrane made of mixed conducting metal oxide material, wherein the membrane module has an oxidant feed side and a permeate side;
   (b) heating the membrane and membrane module to a first temperature, contacting the oxidant feed side with an oxygen-containing gas, and withdrawing an oxygen-enriched gas from the permeate side; and
   (c) controlling the differential strain between the oxidant feed side and the permeate side by varying the oxygen partial pressure on either or both of the oxidant feed side and the permeate side of the membrane module while cooling the membrane and the membrane module.

19. The method of claim 18 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr and Ga; wherein $0 \leq x \leq 1$, $0 \leq y \leq 1$, and $0.95 < w < 1.05$; and wherein $\delta$ is a number that renders the compound charge neutral.

20. The method of claim 19 wherein the mixed conducting metal oxide material has the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral.

21. The method of claim 20 wherein the mixed conducting metal oxide material has the general stoichiometric composition $(La_{0.4}Sr_{0.6})_wCoO_{3-\delta}$ wherein $1.05 \geq w > 0.95$ and $\delta$ is a number which renders the composition charge neutral.

22. The method of claim 18 wherein the oxygen partial pressure on either or both of the oxidant feed side and the permeate side of the membrane is controlled by varying either or both of the oxygen mole fraction and the total pressure on either or both of the oxidant feed side and the permeate side of the membrane, respectively.

23. A method of operating a mixed conducting membrane hydrocarbon oxidation system, which method comprises
   (a) providing at least one membrane module comprising a membrane made of mixed conducting metal oxide material, wherein the membrane module has an oxidant feed side and a permeate side;
   (b) heating the membrane and membrane module to a first temperature, introducing an oxygen-containing gas into the oxidant feed side of the membrane module, introducing a hydrocarbon-containing gas into the permeate side of the membrane module, and withdrawing a hydrocarbon oxidation product from the permeate side of the membrane module; and
   (c) controlling the differential strain between the oxidant feed side and the permeate side by varying the oxygen partial pressure on either or both of the oxidant feed side and the permeate side of the membrane while cooling the membrane and membrane module.

24. The method of claim 23 wherein the hydrocarbon-containing gas comprises methane and the hydrocarbon oxidation product comprises hydrogen and carbon monoxide.

25. The method of claim 23 wherein the differential strain is maintained by varying either or both of the oxygen mole fraction and the total gas pressure on either or both of the oxidant feed side and the permeate side of the membrane.

26. The method of claim 25 wherein the oxygen partial pressure on the oxidant feed side is controlled by varying the oxygen mole fraction on the oxidant feed side.

27. The method of claim 25 wherein the oxygen partial pressure on the permeate side of the membrane is controlled by
   (a) contacting the permeate side of the membrane with a gaseous mixture comprising one or more reducing gases selected from CO, $H_2$, and $CH_4$ and one or more oxygen-containing gases selected from $CO_2$ and $H_2O$; and
   (b) varying the composition of the gaseous mixture and optionally the total gas pressure on the permeate side of the membrane.

28. The method of claim 23 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

29. The method of claim 28 wherein the mixed conducting metal oxide material has the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

30. A mixed conducting membrane system comprising
   (a) a membrane module having a membrane comprising mixed conducting metal oxide material, wherein the membrane module has an oxidant feed side and a permeate side;
   (b) means for heating and cooling the oxidant feed side and the permeate side of the membrane module;
   (c) means for changing the oxygen partial pressure on either or both of the oxidant feed side and the permeate side of the membrane module while heating and cooling the oxidant feed side and the permeate side of the membrane module.

31. The system of claim 30 wherein the means for controlling the oxygen partial pressure on either or both of the oxidant feed side and the permeate side of the membrane module comprises either or both of (1) means for varying the oxygen mole fraction and (2) means for varying the total gas pressure.

32. The system of claim 31 wherein the means for controlling the oxygen partial pressure on the permeate side of the membrane module comprises
   (1) means for contacting the permeate side of the membrane with a gaseous mixture comprising one or more reducing gases selected from CO, $H_2$, and $CH_4$ and one or more oxygen-containing gases selected from $CO_2$ and $H_2O$; and
   (2) means for varying the composition of the gaseous mixture and optionally the total gas pressure on the permeate side of the membrane.

33. The system of claim 30 wherein the mixed conducting metal oxide material has the general stoichiometric composition $(Ln_{1-x}A_x)_w(B_{1-y}B'_y)O_{3-\delta}$, wherein Ln represents one or more elements selected from La, the D block lanthanides of the IUPAC periodic table, and Y; wherein A represents one or more elements selected from Mg, Ca, Sr and Ba; wherein B and B' each represent one or more elements selected from Sc, Ti, V, Mn, Fe, Co, Ni, Cu, Cr, Al, Zr, Mg, and Ga; wherein $0 \leq x \leq 1$, $0 \leq y \leq 1$, and $0.95 < w < 1.05$; and wherein $\delta$ is a number that renders the compound charge neutral.

34. The system of claim 33 wherein the mixed conducting metal oxide material has the general stoichiometric composition $(La_xCa_{1-x})_wFeO_{3-\delta}$ wherein $1.0 > x > 0.5$, $1.1 \geq w \geq 1.0$, and $\delta$ is a number which renders the composition charge neutral.

35. The system of claim 33 wherein the mixed conducting metal oxide material has the general stoichiometric composition $(La_xSr_{1-x})_wCoO_{3-\delta}$ wherein $1.0 > x > 0.1$, $1.05 \geq w > 0.95$, and $\delta$ is a number which renders the composition charge neutral.

36. The system of claim 35 wherein the mixed conducting metal oxide material has the general stoichiometric composition $(La_{0.4}Sr_{0.6})_wCoO_{3-\delta}$ wherein $1.05 \geq w > 0.95$ and $\delta$ is a number which renders the composition charge neutral.

* * * * *

UNITED STATES PATENT AND TRADEMARK OFFICE
CERTIFICATE OF CORRECTION

PATENT NO. : 7,311,755 B2  Page 1 of 1
APPLICATION NO. : 10/943574
DATED : December 25, 2007
INVENTOR(S) : Michael F. Carolan It is certified that error appears in the above-identified patent and that said Letters Patent is hereby corrected as shown below:

Column 22, Line 24

In claim 14 delete the words "$0 \geq x \geq 1, 0 \geq y \geq 1$" and insert the words -- $0 \leq x \leq 1, 0 \leq y \leq 1$ --

Signed and Sealed this

Twenty-ninth Day of April, 2008

JON W. DUDAS
*Director of the United States Patent and Trademark Office*